No. 890,956. PATENTED JUNE 16, 1908.
A. D. BLANK.
FRUIT AND LIKE PACKING PRESS.
APPLICATION FILED DEC. 26, 1907.
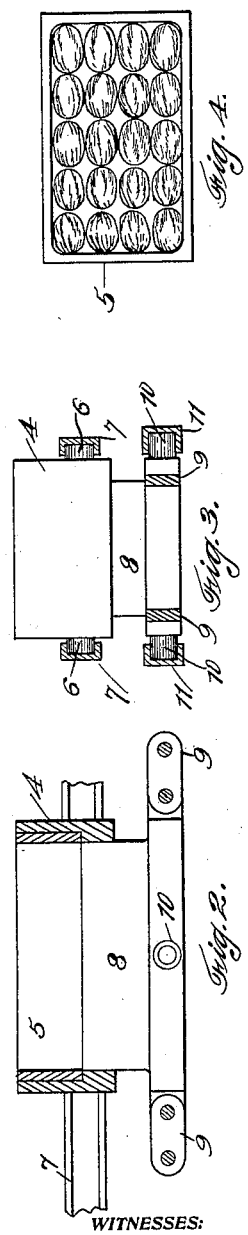
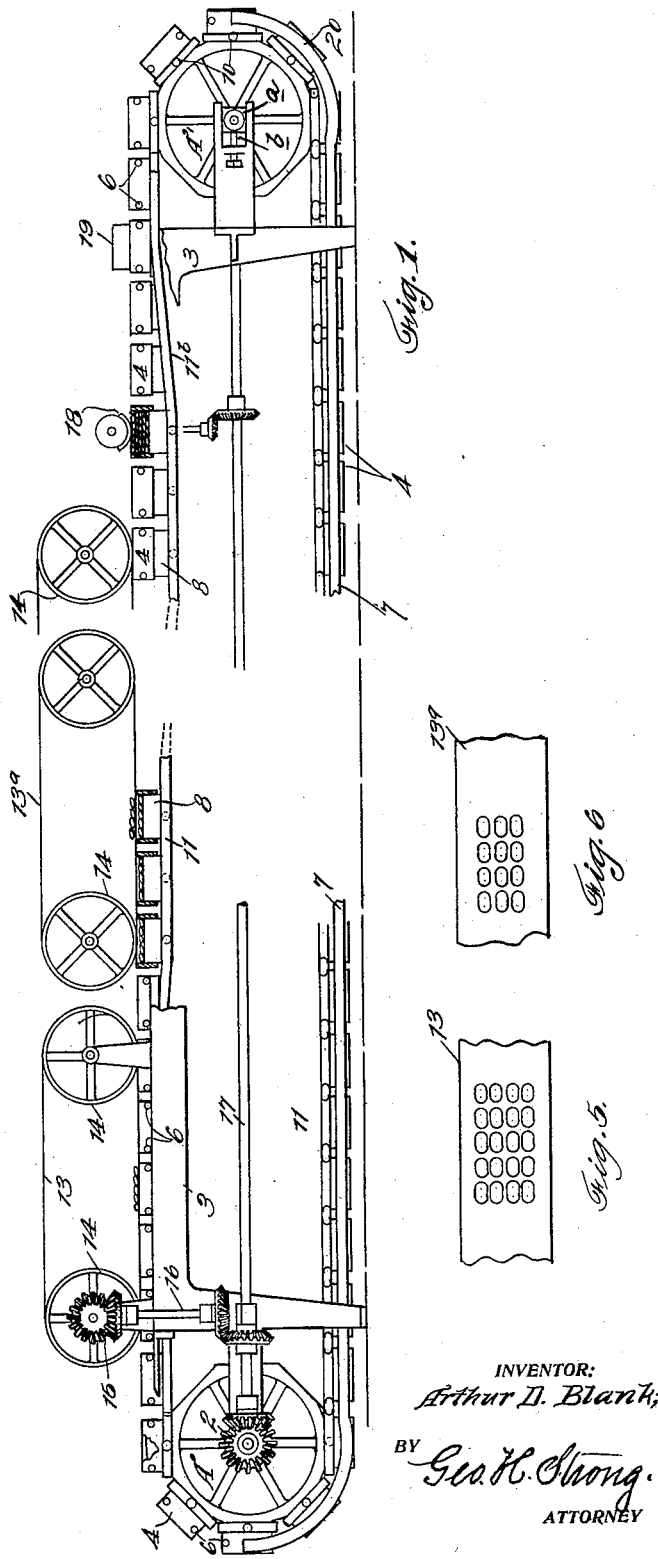
WITNESSES:
INVENTOR:
Arthur D. Blank;
BY Geo. H. Strong.
ATTORNEY

UNITED STATES PATENT OFFICE.

ARTHUR D. BLANK, OF SAN FRANCISCO, CALIFORNIA.

FRUIT AND LIKE PACKING PRESS.

No. 890,956.  Specification of Letters Patent.  Patented June 16, 1908.

Application filed December 26, 1907. Serial No. 407,990.

*To all whom it may concern:*

Be it known that I, ARTHUR D. BLANK, citizen of the United States, residing in the city and county of San Francisco and State of California, have invented new and useful Improvements in Fruit and Like Packing Apparatus, of which the following is a specification.

My invention relates to an apparatus which is especially designed for packing prunes and like fruits in attractive form for sale.

It consists in the combination of mechanism, and in details of construction, which will be more fully explained by reference to the accompanying drawings, in which—

Figure 1 is a side elevation showing the ends, and portions of my apparatus. Fig. 2 is a longitudinal section of the mold. Fig. 3 is an end view of same. Fig. 4 is a plan view of the liner, packed. Figs. 5 and 6 show portions of the screen belts.

The apparatus consists of an endless chain of molds of any suitable length to provide sufficient space for the various operations which will take place.

At each end of the apparatus are drums A, A' around which the endless chain of packing molds is made to pass. One or both of these drums may be driven by a bevel gear, as at 2, or in other suitable manner from a suitable motor, and the whole may be mounted upon any suitable frame-work. Such frame-work is indicated at 3. The drums are relatively adjustable by having the boxes *a* of one drum movably mounted in suitable bearings and adjusting screws *b* engaging the movable boxes, as shown in Fig. 1. This allows me to maintain the proper tension of the chain.

The molds consist of outer iron shells 4, within which are preferably fitted aluminum linings 5, the shells and linings being here shown rectangular in form, and of such size as to contain packages of any desired size and weight; such as one, two, three, five, ten or more pounds, as desired.

The exterior metal shells 4 preferably have the upper portion so recessed that each can receive a lining 5, as shown in Fig. 2. The linings have their interior angles rounded so as to measurably fit and shape the prunes or other material, and give attractive form to the package.
The outer shells 4 have journaled upon opposite sides, rollers 6, which are adapted to travel in guides upon the frame. I have here shown these guides as made of angle-iron, as shown at 7, Fig. 3.

8 are plungers of such dimensions as to fit snugly into the open bottoms of the shells. These plungers have their bases connected together by links 9, so that the whole forms an endless traveling chain which passes around the drums A, as previously described.

The shells or cases are maintained in their line of travel by the rollers 6 which travel in the guiding grooves or equivalent supports of the frame, and thus maintain the shells and their linings in a single line of travel.

The plungers have rollers 10 projecting upon each side, and these travel in grooves or channels, as at 11, which grooves or channels are so disposed with relation to those of the mold shells, that at the commencement of the apparatus the plungers will be inserted into the shells to such an extent that only sufficient space is left in the upper part for the reception of a single layer of the fruit to be packed. Then after this layer of fruit has been introduced, the plungers are moved downwardly sufficient to receive another layer, by an inclination of the guiding channel 11, as plainly shown in Fig. 1, where this channel slopes downwardly and carries the plunger down sufficiently to allow another layer of the fruit to be introduced; and so on until all the upper portion, which forms the fruit mold, has been filled.

The method of filling is as follows: Above the traveling mold shells, previously described, is an endless traveling screen 13 which passes around drums 14; and these drums are rotated and the screen caused to travel around these drums by means of bevel gears 15 mounted upon vertical shafts 16, and having gear connections with a main drive-shaft 17, or by other well known equivalent means, so that the belt 13 is caused to travel at the same rate of speed with the shells which are moving beneath. This belt of wire screen has reticulated openings so shaped and arranged that each of these openings is substantially equal to the area of the shell mold which is movable beneath, and which is made to register with the opening in the screen. The fruit to be packed being placed upon the lower part of the traveling screen between the drums 14, is introduced through the opening into the mold passing beneath, by one or more assistants, and the layers of fruit thus introduced may be of sufficient numbers in length and width to just fill the shell and form a single layer resting upon the top of the plunger 8, which while passing beneath the first screen 13 is maintained by its rollers and guide channels at such an elevated position as to receive the single layer only. The openings in revolving screens may be subdivided into smaller interstices, each interstice allowing each piece of fruit or other material to be deposited in its proper position in the layer. After the mold has passed beneath the first of the endless screens 13, it passes through a space between this and the next screen, which in like manner passes around drums 14, and is caused to travel in the same manner as described for the first screen. This screen likewise has reticulated openings which coincide with the top of the passing molds. The groove or channel 11 which guides the rollers 10 of the plunger, inclines downwardly in the space between the contiguous drums 14, so that when the mold shells have arrived beneath the lower part of the second screen 13$^a$, the plunger will have been depressed sufficiently to allow another layer of the fruit or material to be packed to be introduced through the openings in this second screen. Thus, as shown in Fig. 5, if prunes are being packed in the molds, the prunes being of a certain size, such as may be undergoing the process of packing, there may be five prunes in length and four in width, to cover the top of the plunger in the first layer. When the next packing screen is reached, the prunes may be so placed as to lie at the junction of each four of the previous layer, which will make a layer composed of four in length and three in width. Between this second screen and the next one, the guide 11 takes another incline which carries the plunger down again sufficiently to allow another layer to be introduced through the openings in the third endless screen which travels above the shells, and thus space is made for a third layer, which may again correspond with the layer which was first placed upon the plunger. The plunger is thus lowered by steps until a sufficient number of layers have been introduced to fill the mold to the required depth. At this point either a rolling or reciprocating plunger may be placed, so that when the filled mold emerges from beneath the last endless screen and its final drum, this compression device serves to compact this fruit within the mold.

It will be manifest that a compression device may be used after each successive layer, or after alternate layers, as well as after completion of package.

In the present case, I have shown a roller pressure device, as at 18, but it will be understood that a reciprocating plunger may be used with equal effect. After passing this compacting plunger, the guide-way 11 again inclines upwardly, as shown at 11$^b$, and this causes the plunger to rise until it reaches its normal position, and thus forces out the block of pressed fruit, as indicated at 19. The inner mold shell 5 is also moved outward with its contained body of fruit, and from this inner shell the fruit may be transferred to suitable cases in which it is eventually packed for sale, and the lining shell is again in readiness to be used, unless of a character intended to remain permanently on the package. The fruit thus prepared is in the form of the well known "bricks", as they are called, in which they are displayed for sale in the market. The empty molds then passing around the terminal drum A', the guide rollers 6 are directed into a channel 20, which, extending along the lower part of the frame, maintains the shells in proper position, and prevents their sagging while returning to the drum A, over which they pass into the position first described, and in readiness to receive a new charge of the material to be packed.

Having thus described my invention, what I claim and desire to secure by Letters Patent is—

1. A fruit and like packing apparatus consisting of traveling molds, bottoms slidable within said molds, and means by which the bottoms may be retracted after each layer has been placed.

2. An apparatus for packing fruit and the like, consisting of connected traveling molds, bottoms slidable within said molds, surfaces adapted to travel above and contiguous to the molds, and having openings to register with the molds for the insertion of the material to be packed, in layers, means by which the bottoms are successively retracted after each layer is placed, until the molds are filled, and means for compressing the material within the molds.

3. An apparatus for packing fruit and the like, consisting of connected traveling molds, bottoms slidable within said molds, surfaces adapted to travel above and contiguous to the molds, and having openings to register with the molds for the insertion of the material to be packed, in layers, means by which the bottoms are successively retracted after each layer is placed, until the molds are filled, and means for subsequently raising the mold bottoms and ejecting the completed package.

4. In an apparatus for packing fruit and the like, a series of connected traveling molds, bottoms fitting and movable within said molds, cam tracks, and projections from the sides of the bottoms engaging the cam tracks, whereby the bottoms are raised within the molds to admit a single layer of fruit, and successively retracted to admit subsequent layers until the molds are filled.

5. An apparatus for packing fruit and the like, consisting of connected traveling molds, projections upon the exterior sides of the molds and guides within which said projections travel, bottoms fitting and slidable within the molds, said bottoms having projections from the sides, guides into which said projections extend, said guides being so arranged that the bottoms are first raised within the molds to allow a single layer of material to be placed therein, said bottoms being successively retracted to allow subsequent layers until the molds are filled, means for compressing the package within the molds, and means for subsequently raising the bottoms and ejecting the completed package.

6. In an apparatus of the character described, connected and guided traveling molds, similarly guided bottoms or plungers movable within the molds and capable of being gradually retracted to allow successive layers of material to be introduced until the molds are filled, surfaces adapted to travel contiguous to and in unison with the movement of the molds, said surfaces having openings corresponding with those of the molds, whereby the material to be packed may be introduced into the molds in successive layers, means for compressing the material when the molds are filled, and means for expelling the completed packages.

7. In an apparatus of the character described, bottomless molds having interior slidable linings, plungers fitting the molds, means by which said plungers are first placed near the top to allow a single layer of material to be placed thereon within the molds, means by which the plungers are successively retracted to receive an additional layer of material, until the mold is filled, and means for compressing and means for ejecting the completed package.

8. In an apparatus of the character described, bottomless molds having the upper portion recessed, and independent linings fitting therein at the part where the package is to be formed, said linings having rounded inner angles to fit and shape the periphery of the package.

9. In an apparatus of the character described, bottomless molds having flexible connections, means by which said molds are guided in a substantially straight line of travel, means by which the molds are advanced, bottoms or plungers fitting said molds having guide rollers projecting from the lower part, guides located in the line of travel of the bottoms and within which the guide rollers are movable, said guides being inclined at intervals so that the plungers are first raised within the molds to allow a single layer of material to be placed therein, and retracted after each layer sufficiently to allow a single layer to be subsequently placed in the molds, and traveling screens or surfaces movable in unison with and contiguous to the upper surfaces of the molds, said screens having openings registering with the openings in the mold whereby the successive layers of material may be placed in the molds during their travel.

10. In an apparatus of the character described, a series of open-bottomed molds flexibly connected together to form an endless chain, drums around which said chain of molds passes at each end of its travel, projections or rollers on the sides of the molds, channel guides within which said projections travel to maintain the molds in position, plungers fitting the bottoms of the molds having projections or rollers upon each side of the lower part, and guide channels into which said rollers extend, said channels being so related to the mold guides that the plungers will first be carried near the top of the molds, with sufficient space to receive a single layer of material to be packed, then inclining downward between the first and second filling positions to receive a further layer, and after the molds are filled, inclining upwardly, so that the plungers are raised to eject the completed package.

11. In an apparatus of the character described, a chain of flexibly connected open-bottomed molds, drums around which the chain passes at each end of its travel, guides whereby the molds are caused to move in a substantially straight line at the upper portion of their travel, other guides extending along the lower portion of their travel, whereby the chain of molds is caused to travel in substantially straight lines between the lower parts of the drums, means for revolving the drums to advance the chain of molds, and means for relatively adjusting the drums to maintain the proper tension of the chain.

12. In an apparatus of the character described, an endless flexible chain formed of open molds with flexible connecting links forming an endless chain, drums around which said molds are adapted to pass, plungers, and guides by which said plungers are moved from the upper to the lower part of the mold to successively receive single layers of material to be packed, endless traveling screen belts having the lower parts movable contiguous to and parallel with the movement of the upper surfaces of the molds, and having openings made therein, through which layers of material may be successively placed in the molds while traveling, a compression device located with relation to the feeding tables, and inclined guides with which the plungers are engaged, and by which they are raised to eject the completed packages after compression.

13. In an apparatus of the character described, a series of connected, traveling open mold shells, with plungers, and means for retracting said plungers to receive successive layers of material, screens or surfaces adapted to move in unison with and contiguous to the upper sides of the molds, said surfaces having openings registering with the molds and formed with reticulations through which the material passes, and by which it is symmetrically disposed in the molds.

In testimony whereof I have hereunto set my hand in presence of two subscribing witnesses.

ARTHUR D. BLANK.

Witnesses:
   GEO. H. STRONG,
   CHAS. A. PENFIELD.